US007080961B1

(12) United States Patent
Blatt (10) Patent No.: US 7,080,961 B1
(45) Date of Patent: Jul. 25, 2006

(54) DISTRIBUTION ASSEMBLY FOR PARTICULATE MATERIAL

(76) Inventor: Michael S. Blatt, 5100 NE. 27th Ter., Lighthouse Point, FL (US) 33064

( * ) Notice: Subject to any disclaimer, the term of this patent is extended or adjusted under 35 U.S.C. 154(b) by 0 days.

(21) Appl. No.: 11/088,601

(22) Filed: Mar. 24, 2005

Related U.S. Application Data

(63) Continuation-in-part of application No. 10/227,729, filed on Aug. 26, 2002, now Pat. No. 6,883,736.

(51) Int. Cl.
*B60P 1/60* (2006.01)

(52) U.S. Cl. .................. 406/39; 406/144; 406/122; 406/153

(58) Field of Classification Search .................. 406/93, 406/94, 127, 144, 38, 39, 40, 41, 42, 43, 406/44, 122, 153
See application file for complete search history.

(56) References Cited

U.S. PATENT DOCUMENTS

| 1,363,610 A | * | 12/1920 | Mowry et al. ............... 406/144 |
| 2,364,199 A | * | 12/1944 | Derr ........................... 422/206 |
| 2,391,048 A | | 12/1945 | Vose |
| 3,206,255 A | * | 9/1965 | Gray ........................... 406/93 |
| 3,305,140 A | | 2/1967 | Johnson |
| 3,504,945 A | | 4/1970 | Leibundgut et al. |
| 3,542,250 A | | 11/1970 | McRitchie |
| 4,197,037 A | * | 4/1980 | Dede ........................... 406/128 |
| 4,249,839 A | * | 2/1981 | Vance ......................... 406/109 |
| 4,387,852 A | | 6/1983 | Mattson et al. |
| 4,474,327 A | | 10/1984 | Mattson et al. |
| 4,809,913 A | | 3/1989 | Gunlock |
| 4,834,004 A | | 5/1989 | Butuk et al. |
| 4,913,356 A | | 4/1990 | Gunlock |
| 5,092,526 A | | 3/1992 | Takata |
| 5,190,225 A | | 3/1993 | Williams |
| 5,351,890 A | | 10/1994 | Clements |
| 5,593,252 A | * | 1/1997 | Relin et al. .................. 406/85 |
| 5,899,641 A | * | 5/1999 | Pfeiffer ....................... 406/144 |
| 5,931,393 A | | 8/1999 | Alsip et al. |
| 5,947,384 A | | 9/1999 | McCauley |
| 5,964,420 A | | 10/1999 | Hampton |
| 6,070,814 A | | 6/2000 | Deitesfeld |
| 6,283,679 B1 | | 9/2001 | Gregor et al. |
| 6,343,896 B1 | * | 2/2002 | Goodier et al. .............. 406/43 |
| 6,343,897 B1 | * | 2/2002 | Cutler ......................... 406/143 |
| 6,883,736 B1 | | 4/2005 | Blatt |

* cited by examiner

*Primary Examiner*—Joe Dillon, Jr.
(74) *Attorney, Agent, or Firm*—Malloy & Malloy, P.A.

(57) ABSTRACT

An assembly for distributing particulate material comprising a blower assembly which is preferably removably mounted on a mobile platform and structured to generate a forced flow of air along a flow path and through a manifold assembly connected to a supply of material being distributed. The manifold assembly includes a receiving segment incorporating a Venturi section facilitating the entrainment of the material into the forced air flow passing through a discharge conduit preferably having an extended length to facilitate distribution of the material to a plurality of locations in a variety of different environments. A vent assembly is provided to relieve back pressure from within the discharge conduit, which may be created due to its extended length.

22 Claims, 8 Drawing Sheets

DISTRIBUTION ASSEMBLY FOR PARTICULATE MATERIAL

CLAIM OF PRIORITY

The present application is a continuation-in-part application of a previously filed, now U.S. Pat. No. 6,883,736 application having Ser. No. 10/227,729, filed on Aug. 26, 2002, which is in incorporated herein in its entirety by reference.

BACKGROUND OF THE INVENTION

1. Field of the Invention

This invention relates to an assembly for distributing fertilizer, as well as a large variety of other particulate materials, which is adaptable to be mounted on different types of ground or water traveling vehicles. The distribution assembly is structured to regulate the entrainment of the particulate material into a forced air flow which serves to distribute the material throughout significantly large and/or hard to reach areas.

2. Description of the Related Art

Air blower assemblies are well known and have been used for a variety of applications for many years. Typically, such devices are relatively light weight and as such are portable, being typically hand held or otherwise supported on a users body. In operation, such devices include an impeller which draws air into a housing and out through a housing outlet commonly associated with an elongated nozzle or like flow directing structure. The air is expelled at a significantly high flow rate in order to create an air stream having sufficient force to remove leaves, dirt and a variety of other types of debris from driveways, walkways and other surface areas.

The extensive use of known blower assemblies has led to their adaptation for numerous applications, other than that described above. More specifically, attempts have been made to structurally modify conventional blower assemblies for use either in a vacuum mode or in a forced air discharge mode, respectively intended to either collect or disperse debris and like materials. In addition to the above, blower devices have been found to be particularly useful, when structurally modified in the proper manner, to aid in the distribution of various types of materials. Appropriately modified blowers intended for this use serve to supplement manual seed and/or fertilizer spreaders commonly employed to plant and maintain lawns, grass turf or the like. Therefore, it is generally recognized that the high velocity air stream generated by the typical blower assembly provides a versatile and efficient means of distributing materials to and/or throughout a wide variety of areas, not capable of being serviced by more conventional spreaders.

While such prior art attempts may be considered to be at least minimally operative in accomplishing their intended purpose, devices of this type lack versatility and have been found to be less than efficient. Other disadvantages associated with spreaders incorporating a forced air flow is an inability to adequately regulate delivery of the intended material due at least in part to an inconsistent feeding control of material to the generated air stream. This type of ineffective performance results in an uneven or otherwise inefficient distribution of materials to and/or throughout the area being serviced.

In addition, it has been found that attempted modifications to incorporate a blower commonly require the use of relatively short discharge nozzles, which limits the range or area throughout which the particulate material may be effectively spread. As a result, areas which are more difficult to reach must be serviced by personnel manually carrying a blower/spreader. However, due to the high rate of material discharge, a large quantity of material can be discharged in a short period of time. Therefore unless an operator can carry a significantly large quantity of the material being dispersed, the operator must repeatedly return to a supply area for replenishment of the material in order to properly service terrain which is not easily accessible. Accordingly, it is obvious that at least some body supported assemblies, while being capable of reaching isolated areas, are not consistently operative for a long period of time and are therefore not practical.

Based on the above, there is a significant need for an assembly capable of effectively distributing particulate material having a wide range of particulate sizes, wherein such an improved distribution assembly would maintain efficient control of the supply flow of material to a generated air stream and thereby distribute the particulate material consistently throughout an area targeted for treatment. Further, such a preferred or improved distribution assembly should include operative and structural components which allow the dispersal area to be greatly increased over that possible when using conventional spreaders. Also, a preferred distribution assembly of the type set forth herein should have the structural and operational versatility to be used in combination with a variety of different vehicles or like mobile platforms in order to spread various materials over different ground surfaces and/or throughout a water environment. Further, such an improved distribution assembly should be easily converted, without structural modification, for use as a blower, in the conventional fashion, or for use as a spreader as described above. Finally, when utilized with a mobile platform, the improved distribution assembly of the type set forth herein should be easily mounted on and removed from the platform in order that the mobile platform can be used in the performance of other applications for which it may have been originally designed.

SUMMARY OF THE INVENTION

The present invention is directed to an assembly structured to rapidly and efficiently distribute a variety of different particulate materials such as, but not limited to, fertilizer and the like by utilizing a blower assembly in combination with a uniquely structured manifold assembly. Further, the distribution assembly of the present invention overcomes many, if not all, of the disadvantages and problems associated with conventional or known particulate spreaders. In doing so, the distribution assembly may be used independently of or be mounted on any of a variety of different mobile platforms including wheeled vehicles or structures which are motorized or manually powered, as well as various types of marine craft. Accordingly, depending on the specific application, the distribution assembly of the present invention can be utilized to disperse particulate material of various types and sizes both over a large area ground surface and throughout a water environment.

In order to fully emphasize the versatility of the distribution assembly of the present invention, specifically relating to the size and type of material capable of being dispersed, the following provides examples of materials which may be effectively used with the subject distribution assembly. However, the following material sizes, categories, etc. are not meant to be all inclusive but are representative only of the wide range of particulate materials which may be dispersed in the intended fashion. More specifically, materials that can be distributed by the distribution assembly of the present invention include fertilizer for turf and ornamental plants, herbicides, pesticides, fungicides, rock salt, aquatic herbicide materials, agriculture materials, forestry grade fertilizers, pelletized fish food and marine nutritional supplements, minor elements, organic fertilizers, seed, granular wetting agents, granular baiting material, as well as others. The size of the particulate material capable of being dispersed through the use and application of the distribution assembly of the present invention includes dust, powder, mini-pill, micro-pill, standard pill, homogeneous blend fertilizers, sand, etc. As such, the distribution assembly may be applicable for use in a variety of different areas including business segments associated with pest control, landscaping, turf management, nurseries, municipalities, home owner associations, golf courses, theme parks, athletic fields, fisheries, aquatic control companies, tree farms, etc. Also, the distribution rate of the particulate material which passes through the distribution assembly is generally in the range of substantially 30 or more pounds per minute, depending upon the length of the discharge conduit and the blower size.

The operational versatility of the distribution assembly of the present invention is further enhanced by at least some of the components thereof being removably secured to a mobile platform and being otherwise structured such that the user has the ability to control the use of the distribution assembly in direct association with various types of mobile platforms. In addition, the cooperative structuring of the distribution assembly and the mobile platform allows the mobile platform to operate in its normally intended fashion, when the distribution assembly attached thereto is temporarily and purposefully rendered inoperative. The ability to adapt the subject distribution assembly to a variety of different vehicles allows access to almost any land surface or body of water where appropriate vehicles can travel.

Accordingly, the distribution assembly of the present invention comprises a blower assembly structured to generate a substantially high velocity stream of air along a predetermined flow path. The predetermined flow path is at least partially defined by a plurality of operative components connected to one another, such that the generated air flow passes from the blower assembly along the predetermined flow path to a discharge conduit. Further, in order to overcome additional recognized disadvantages and problems associated with known particulate material spreaders, the discharge conduit may be made from a flexible, high strength, durable material and be of an extended length. The extended length of the discharge conduit facilitates the particulate material being delivered directly from a high capacity material supply throughout a wide area of dispersal. Also, the flexibility of the elongated delivery conduit allows it to be selectively disposed into any of an almost infinite number of positions or orientations in outwardly extending, substantially surrounding relation to the blower assembly and to the mobile platform on which the blower assembly and other components of the distribution assembly are mounted.

The distribution assembly further includes a manifold assembly interconnected in fluid communication with the blower assembly downstream thereof. Further, the manifold assembly is interconnected upstream of the discharge conduit and is structured to regulate the flow of air and material along as well as establish a continuous venting of the predetermined flow path and/or at least a portion thereof extending from the manifold assembly to the exit or discharge end of the discharge conduit. The manifold assembly includes a delivery conduit connected in communicating relation with the interior of a supply container in which the supply of material is maintained.

The supply container, as indicated above, can be a part of the vehicle or mobile platform used to position and support the distribution assembly and can vary in size, capacity, configuration, etc. Preferably, the material supply container and the delivery conduit of the manifold assembly are cooperatively disposed and structured to allow passage of the material into the delivery conduit by means of gravity flow and/or under the influence of a negative pressure. To adequately regulate flow of the particulate material to the delivery conduit and the manifold assembly, a valve assembly is disposed between the material supply and the delivery conduit. The valve assembly can be operated from a location on or off the mobile platform from a location spaced from the manifold assembly and the material container.

The manifold assembly further includes a receiving segment preferably disposed to define at least a portion of the aforementioned predetermined flow path along which the generated air stream from the blower assembly travels. The receiving segment is connected in fluid communication with the delivery conduit, such that the material passing into the delivery conduit will travel downstream from the delivery conduit to the interior of the receiving segment. In at least one preferred embodiment of the present invention, the receiving segment includes a Venturi section characterized by a restricted or reduced diameter throat portion disposed along the flow path. Reduced pressure resulting from the well known Venturi effect will communicate with the delivery conduit, further facilitating passage of the particulate material there along to a location where it is entrained within the air stream and predetermined flow path. Once so entrained, the particulate material passes along the extended length of the discharge conduit until it exits from the outer, open end thereof.

As set forth herein an extended length of the discharge conduit enhances the versatility of the distribution assembly of the present invention by allowing the material to be spread over a larger dispersal area and into relatively hard to reach locations with an efficiency not previously obtainable using conventional or known spreader assemblies. Accordingly, one feature of a preferred embodiment of the present invention is structuring of the manifold assembly to include adequate venting, through the provision of a continuously open vent assembly disposed and structured to vent virtually any back pressure to an exterior of the manifold assembly. More specifically, the vent assembly is structured to reduce or eliminate the buildup of back pressure within the elongated discharge conduit and/or the manifold assembly especially, but not exclusively, in the area of the delivery conduit.

Due to the extended length of the discharge conduit, rapid flow rate of the air stream passing along the flow path, and/or the orientation of the discharge conduit, the significantly large quantity of material being continuously channeled into the discharge conduit may result in a tendency of the particulate material to "backup" or collect in the discharge conduit and/or the manifold assembly. Such material backup may be especially prevalent if dispersal of material from the discharge conduit is not done on a prolonged or continuous basis. The occurrence of such material backup produces the aforementioned back pressure within a length of discharge conduit and/or the manifold assembly. The existence of back pressure will frequently cause a back flow of material into and at least partially through the manifold assembly and possibly through the delivery conduit into or in a direction of the material supply container. The provision of the continuously open vent assembly connected in fluid communication to or incorporated within and as part of the manifold assembly provides an automatic release of any back pressure whether it originates along the length of the discharge conduit or at any point along the predetermined flow path, including the manifold assembly. In at least one preferred embodiment of the present invention the vent assembly establishes fluid communication between the interior of the delivery conduit and the exterior of the manifold assembly.

As set forth above, one feature of a preferred embodiment of the present invention is the structuring of the manifold assembly to include adequate venting through the provision of a continuously open vent. Moreover, the vent assembly is structured to reduce or eliminate the build up of back pressure within the flow path, which is sometimes caused by any one or more operating characteristics of the distribution assembly of the present invention including, but not limited to, the rate and quantity of particulate material being continuously channeled into the discharge conduit. As a result, particulate material may, on occasion, "back up" and/or collect in the discharge conduit and/or various portions of the manifold assembly. In order to eliminate the back pressure caused by such back up of material, the vent assembly, being structured to be continuously open, serves to release the air flow associated with such back pressure. During such venting, the air flow created by the back pressure may pass back up into the delivery conduit from the flow path and pass into and through the venting assembly. Moreover, particulate material may be carried with "reversed" air flow associated with the back pressure and may have a tendency to accumulate within the vent assembly during the venting or discharge of the back pressure and air flow associated therewith.

Accordingly, one additional preferred embodiment of the present invention is the orienting of the venting assembly and/or the delivery conduit at a predetermined angular inclination or orientation, thereby facilitating removal or passage of the accumulated particulate material from the interior of the vent assembly back into the delivery conduit and eventually into the flow path. The preferred predetermined angular orientation or inclination of the vent assembly and/or the delivery conduit should be such as to be sufficient to facilitate the removal or passage of the accumulated particulate material. Accordingly, the vent assembly, in combination with or independently of, the delivery conduit will be disposed in a predetermined angular orientation relative to the flow path, wherein the predetermined angular orientation is sufficient to facilitate removal of the accumulated particulate material from the vent assembly, at least under the influence of gravity.

As set forth above, the specific structure of the continuously open vent assembly may vary significantly. Accordingly, the relative angular orientation or angle of inclination of the vent assembly relative to the flow path and/or relative to the delivery conduit should be such as to facilitate the aforementioned gravity flow of accumulated particulate material. Such preferred angular orientation or angle of inclination may also be accomplished by angling or inclining the delivery conduit, as well as the vent assembly at a preferred angular orientation. Such "preferred angular orientation" may vary and is not limited to a specific predetermined angle. However, it has been found that an angle of approximately 22 degrees of the delivery conduit from a substantially vertical orientation is appropriate. Further, the specific angular orientation may also depend upon the disposition or location as well as the overall configuration of the vent assembly relative to the delivery conduit.

The distribution assembly of the present invention is thereby structured to efficiently disperse particulate material of varying sizes and types throughout both a land or water environment. The operational characteristics of the distribution assembly of the present invention is further enhanced by being structured for use in combination with or independently of a variety of different mobile platforms including land or water traveling vehicles. Also, in some relatively specialized applications, such as tree farms, groves, orchards, etc, a plurality of distribution assemblies may be mounted on the same vehicle and be concurrently but independently operated.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
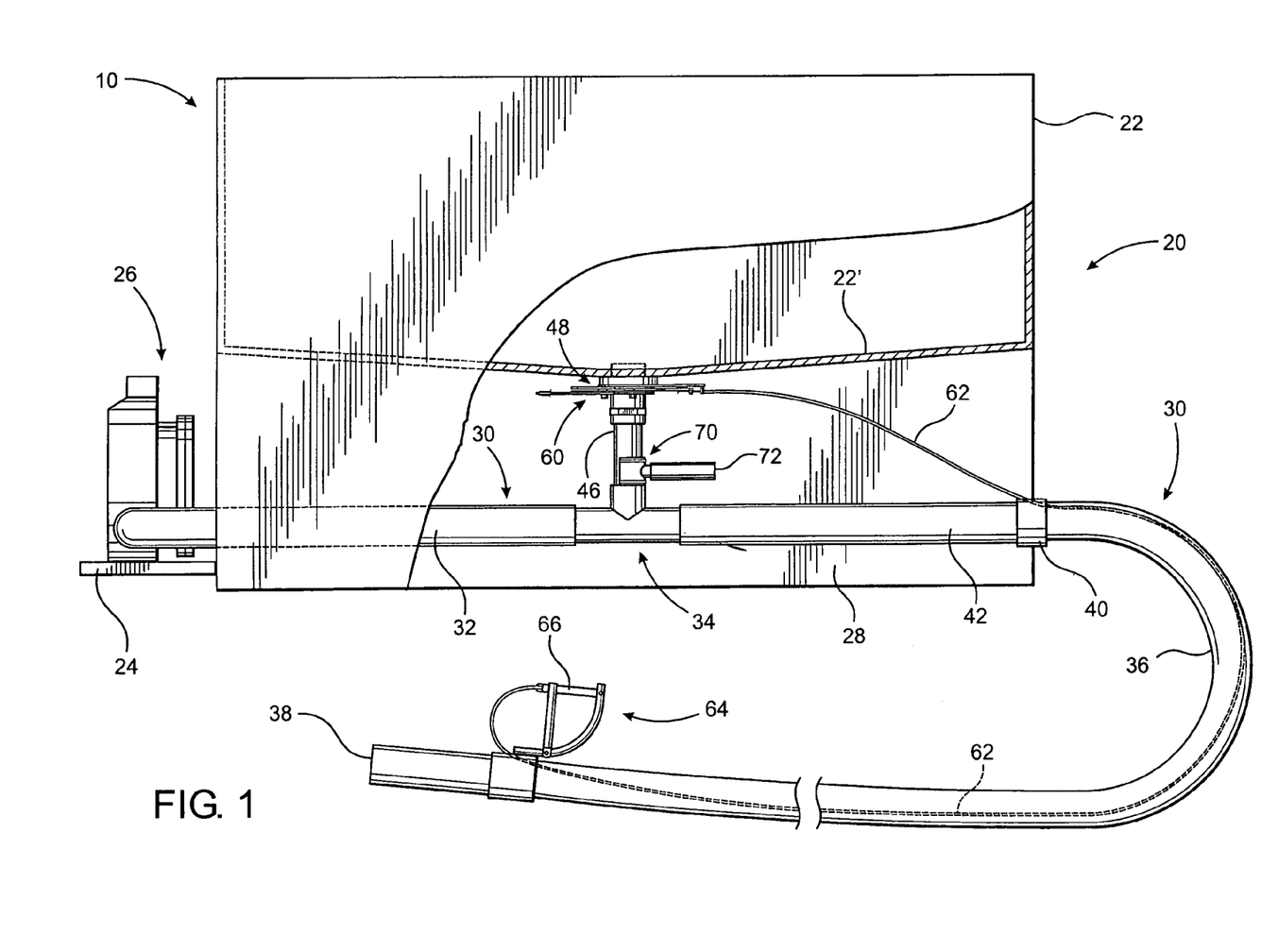
FIG. 1 is a side view in partial schematic form of a distribution assembly of the present invention mounted in combination with a material supply and adapted to be mounted on a variety of different vehicles or mobile platforms.

As shown in the accompanying Figures, the present invention is directed to a distribution assembly, generally indicated as 10 in FIG. 1, which is structured to distribute of a wide range particulate materials such as, but not limited to, fertilizer and the like. As will be further evident from the following description of the one or more preferred embodiments of the present invention, the distribution assembly 10 may be mounted on any of a variety of different mobile platforms.

Figure 3:
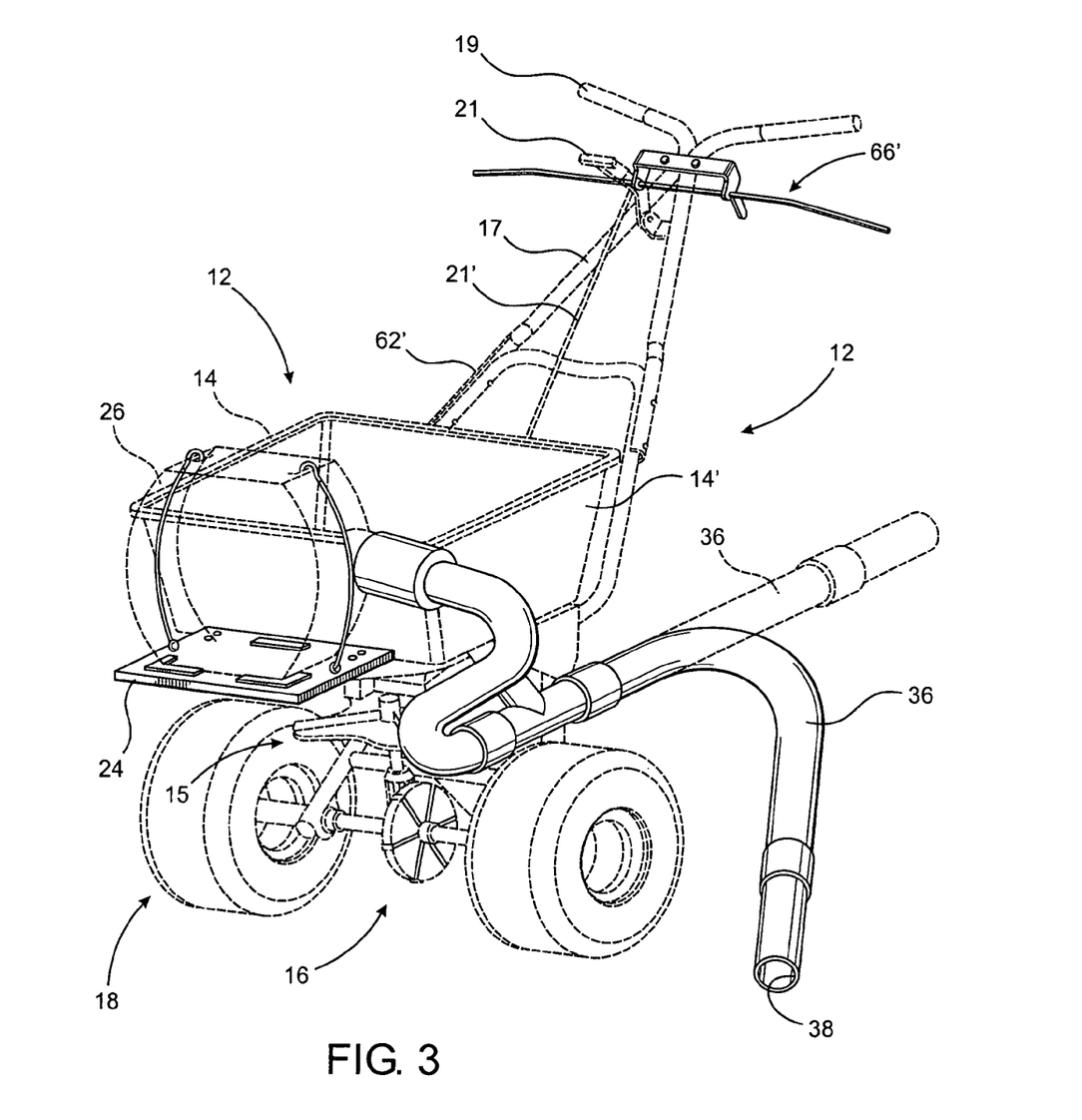
FIG. 3 is a perspective view in partial phantom of a mobile platform in the form of a manually propelled vehicle of the type readily adaptable for the mounting of the distribution assembly of the present invention thereon.
Figure 4:
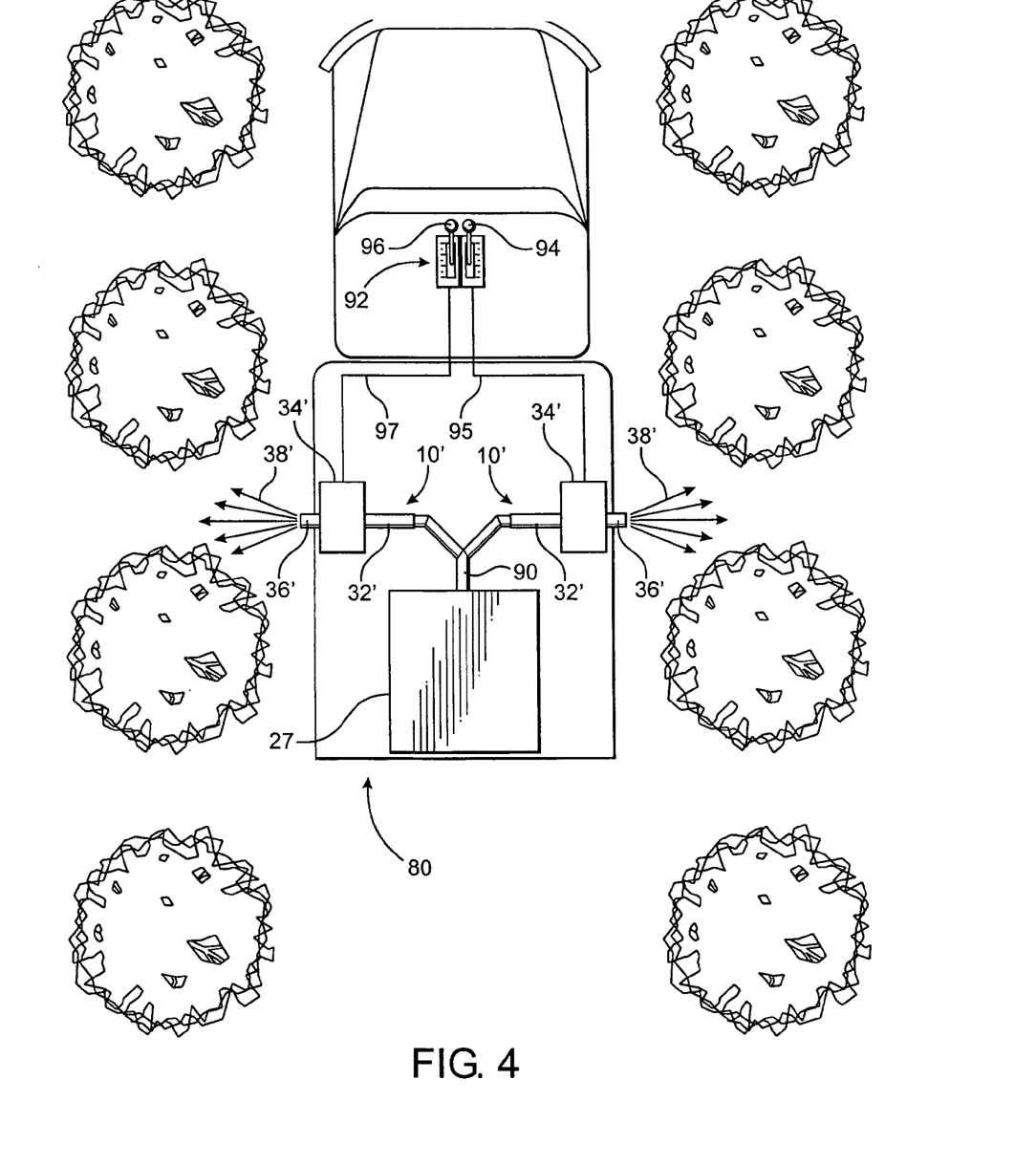
FIG. 4 is a top view in schematic form of yet another preferred embodiment of the distribution assembly of the present invention.
Figures 5, 6:
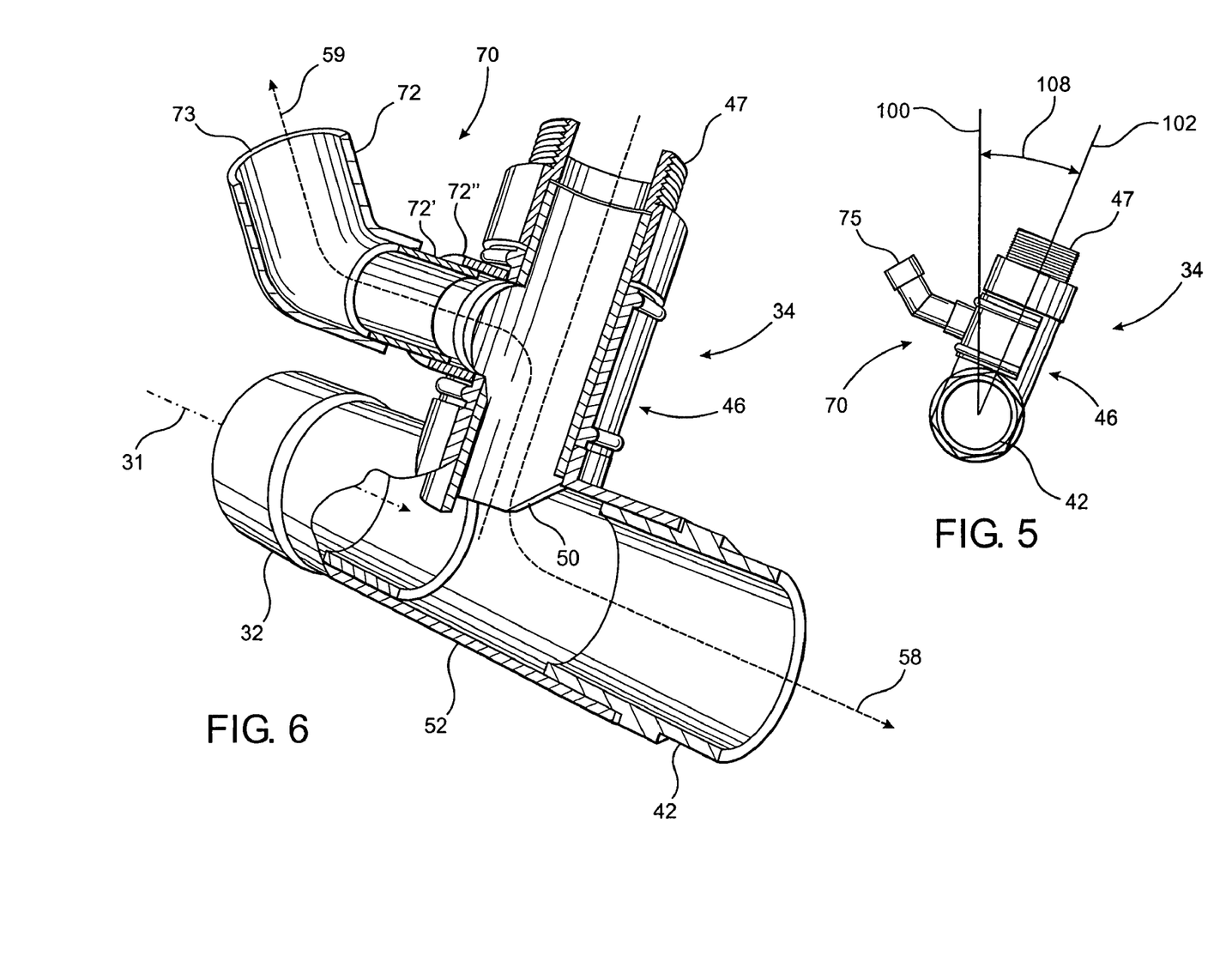
FIG. 5 is an end view in partial schematic form of another preferred embodiment of the present invention relating, at least in part, to a manifold assembly.
FIG. 6 is a perspective view in partial cutaway and section of the embodiment of FIG. 5.
Figure 7:
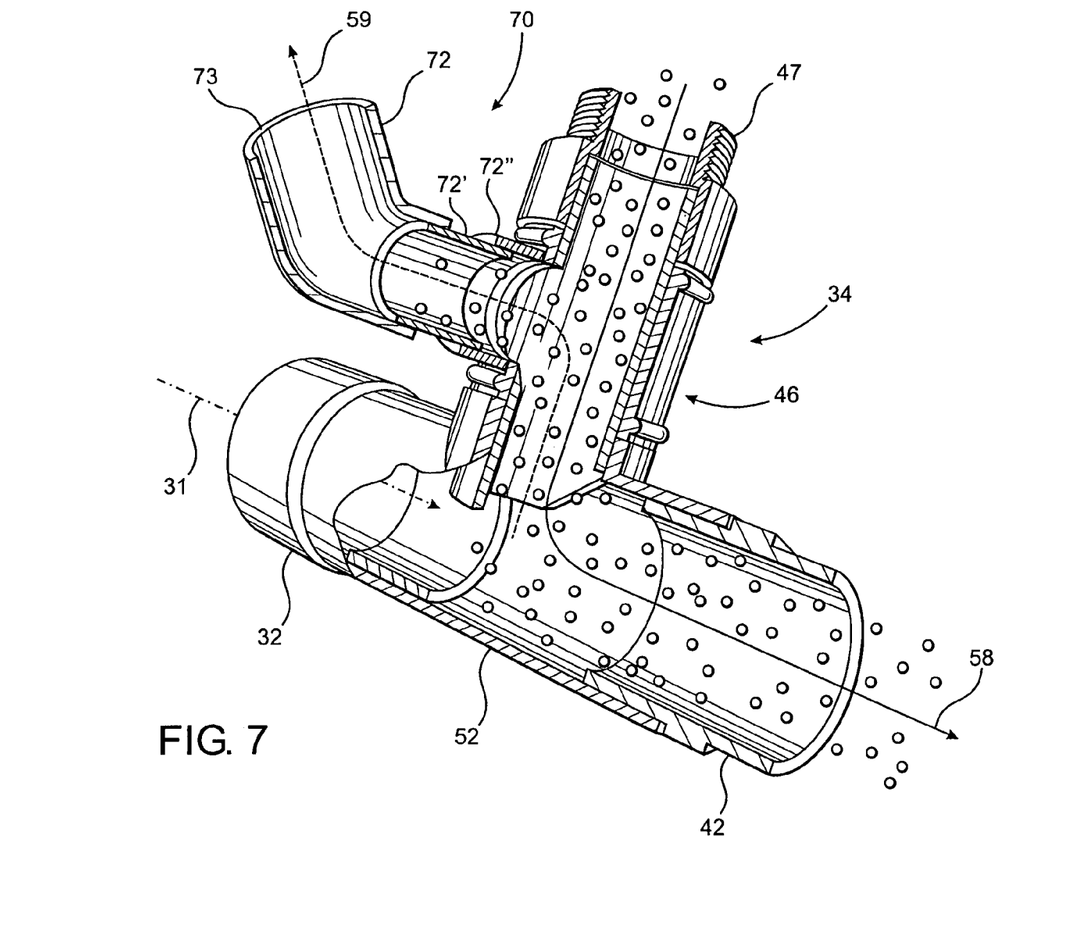
FIG. 7 is a perspective view in partial cutaway and section of the embodiment of FIG. 6 during a specific stage of the operation of the assembly of the present invention.
Figure 8:
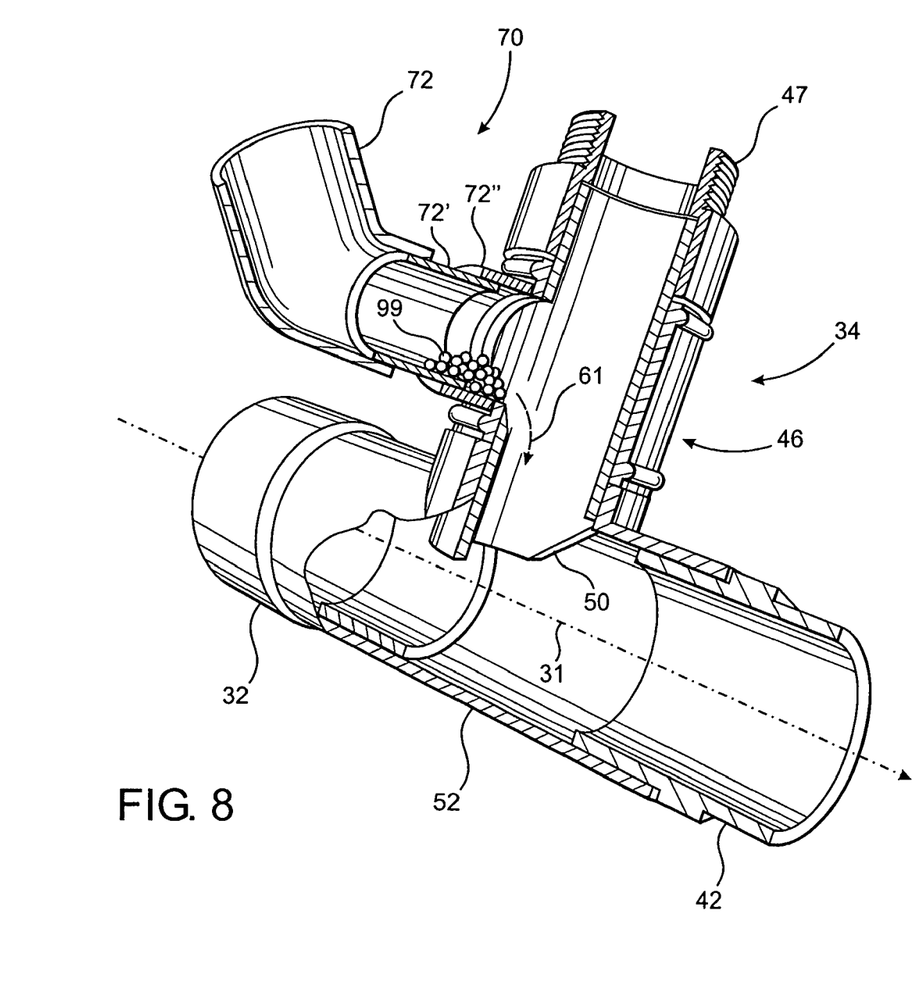
FIG. 8 is a perspective view in partial cutaway and section of the embodiment of FIGS. 5 through 7 in yet another stage of operation of the assembly of the present invention.
Figures 9, 10:
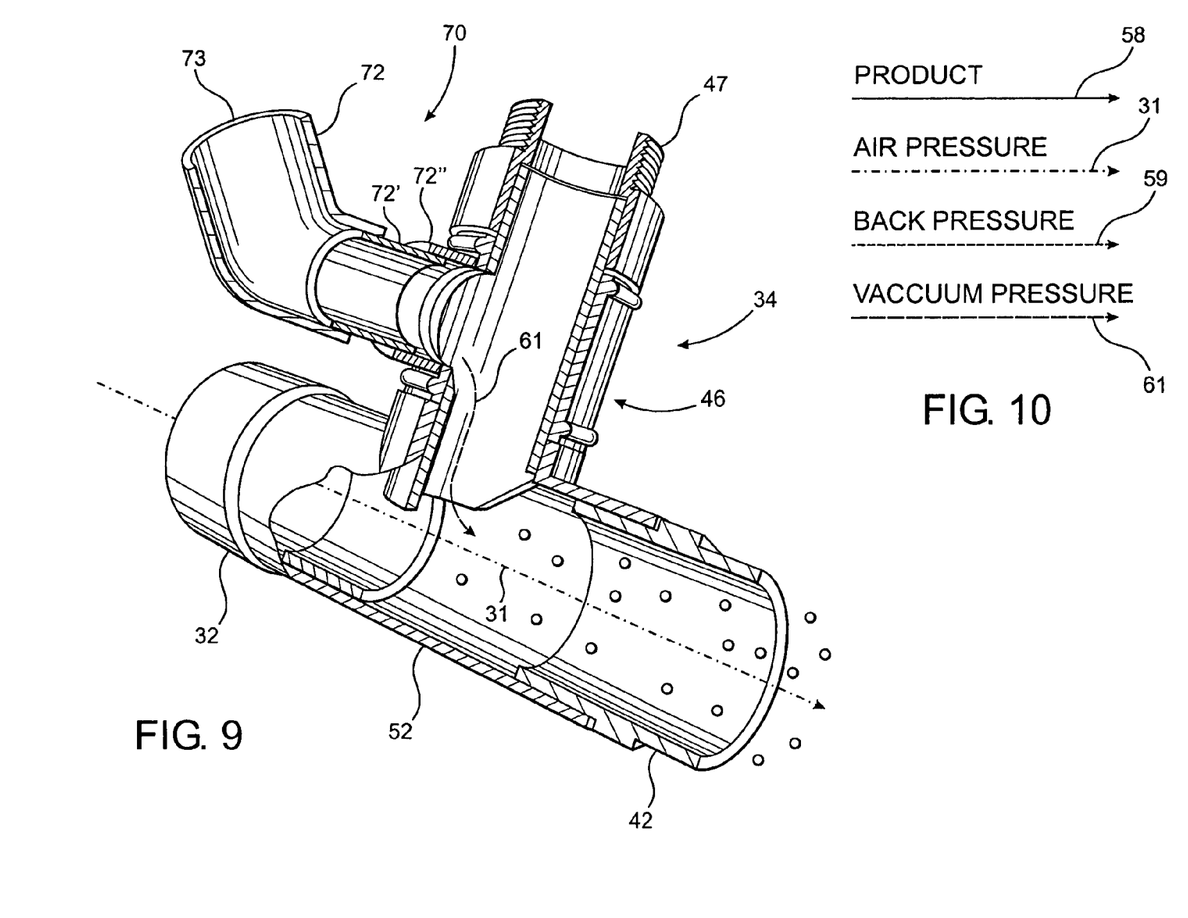
FIG. 9 is a perspective view in partial cutaway and section of the embodiment of FIGS. 5 through 8 in yet another stage of operation of the assembly of the present invention.
FIG. 10 is a legend schematically demonstrating the directional flow of the particulate material product, air pressure, back pressure, and vacuum pressure throughout appropriate ones of the accompanying Figures.

By way of example, such mobile platforms may include, but are not limited to, a manually powered spreader assembly generally indicated as 12 in FIG. 3 and a truck or other motorized vehicle generally indicated as 80 in FIG. 4. The various preferred embodiments of the distribution assembly of the present invention will be described in greater detail hereinafter, with primary references to the appropriate Figures. In addition to the embodiments of FIGS. 3 and 4, the distribution assembly 10 of the present invention may be mounted on a mobile platform in the form of a marine craft. As such, the particulate material may be spread throughout a predetermined water environment, such as when it is desired to distribute aquatic herbicide materials, pelletized fish food and/or nutritional supplements, etc.

Accordingly, the structural and operational versatility of the distribution assembly 10 is further demonstrated by being connected to or mounted on a mobile platform generally indicated as 20, which is intended to be representative of any of a variety of different mobile platforms with which the distribution assembly of the present invention may be used. The mobile platform 20 includes a material supply 22, a support platform 24 for the mounting and/or support of a blower assembly 26 and an under carriage area generally indicated as 28. The under carriage area 28 may of course also vary greatly dependent on the type, category, structure, size, etc. of the mobile platform 20 on which the distribution assembly 10 of the present invention is mounted.

The blower assembly 26 may be of the type typically associated with hand held, body supported or other portable blowers used to generate a forced flow of air for purposes of removing debris from lawn surfaces, walkways, driveways, etc. However, the blower assembly 26 is clearly not intended to be limited to any specific type of blower assembly other than that capable of generating an air stream with a sufficient force to deliver a variety of particulate material along a predetermined flow path and outwardly there from to an intended area or location.

The predetermined flow path is generally indicated as 30 and is at least partially defined by an adaptor section or conduit 32 and a manifold assembly generally indicated as 34. The adaptor section 32 is connected between the blower assembly 26 and the manifold assembly 34 and also defines at least a portion of the predetermined flow path 30. In addition, the distribution assembly 10 further includes a discharge conduit 36 preferably formed from a flexible material and also having what may be referred to as an extended length. The length of the discharge conduit 36 may vary, dependent on the specific application for which the assembly 10 is used. In at least one preferred embodiment the discharge conduit may include an extended longitudinal dimension of at least approximately five feet or greater.

The flexibility and in some cases the extended length of the discharge conduit 36 allows variable positioning thereof relative to the mobile platform 20 on which the assembly is mounted. As such, the particulate material being distributed may exit the outlet or discharge end 38 and be delivered to a variety of different locations throughout an extended and variable range or area of distribution surrounding the mobile platform 20. Discharge conduit 30 may be fixedly or removably connected to the manifold 34 such as by a connection 40. The discharge conduit 36 is connected in fluid communication to the manifold 34 by a second adaptor conduit 42. The second adaptor conduit 42 may be an integral part of the discharge conduit 36 and/or may be fixedly or removably attached to the manifold assembly 34 dependent, at least in part, on the structure, size and/or configuration of the mobile platform 20 to which the distribution assembly 10 is attached.

Figure 2:
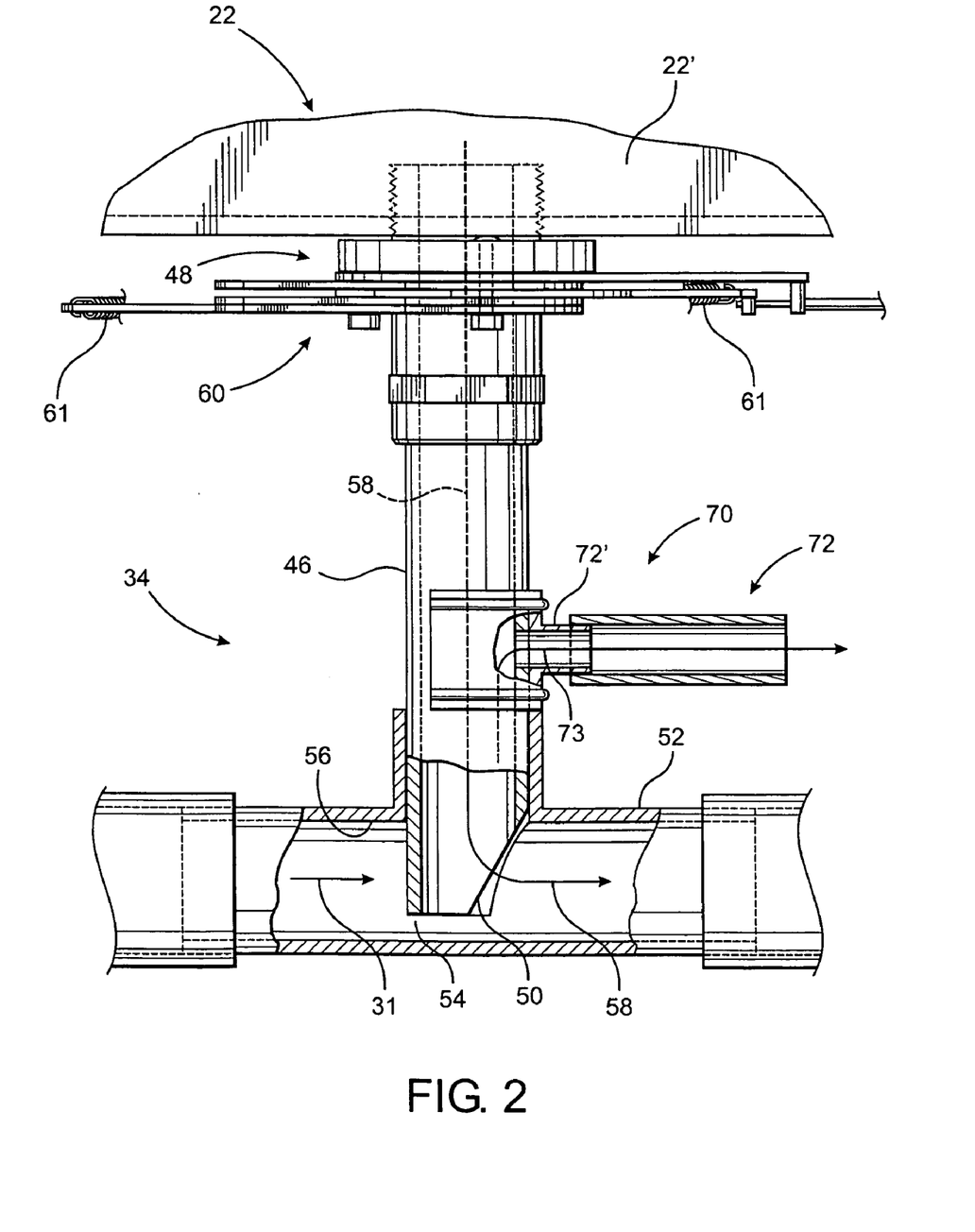
FIG. 2 is a detailed view of manifold assembly associated with the preferred embodiment of FIG. 1.

One feature of a most preferred embodiment of the present invention comprises the manifold assembly 34 shown in detail in FIG. 2. The manifold assembly 34 includes a delivery conduit 46 having an open end 47 connected to a base portion 48 and/or side wall portion 22' of a material supply 22 and disposed in communication with a hollow interior of the delivery conduit. Through such connection, the particulate material is allowed to flow into the interior of the delivery conduit 46, along its length and exit from an outlet end 50. The outlet 50 extends into the interior of the receiving segment or conduit 52 and may include an angular orientation or configuration facing downstream of the aforementioned predetermined flow path 30.

Further, the receiving conduit or segment 52 includes a Venturi section 54 defined by a restricted or reduced diameter throat portion 56. Provision of the Venturi section 54 within the receiving segment 52 creates a negative pressure caused by the well known Venturi effect. The resulting negative pressure is communicated to the interior of the delivery conduit 46 further facilitating removal of the particulate material from the delivery conduit 46. The material is drawn through the open or outlet end 50 of the delivery conduit and into the forced air flow as schematically represented by the directional arrow 58. The particulate material enters the predetermined flow path as it is entrained within the forced flow of air created by the blower assembly 26.

Other structural features associated with the distribution assembly 10 and in particular the manifold assembly 34 comprises the provision of a valve assembly generally indicated as 60. The valve assembly 60 is preferably spring biased or otherwise structured to be normally disposed in a closed position as shown in FIG. 2. One preferred embodiment of the valve assembly 60 includes a multi-component assembly, disclosed in FIG. 2 wherein the plurality of components are moveably and cooperatively interconnected to one another and when assembled are collectively attached to the base portion 48. As set forth above, the base 48 is secured to a bottom or side wall 22' of a material supply 22. As also set forth above, the valve assembly 60 is normally biased, due to the provision of a biasing spring 61, into a closed position thereby preventing the gravity or negative pressure flow of particulate material from the material supply 22 into the manifold assembly 34. It is emphasized, that while one preferred embodiment of the valve assembly 60 is shown in detail in FIG. 2, a number of other embodiments and/or structural modifications of the valve assembly 60 may be equally suited for use with the distribution assembly 10, depending at least in part, on the structure and/or location of the material supply 22 to which it is attached.

With reference to FIG. 1, the valve assembly 60 includes a control assembly including a control line in the form of a wire, cable, etc. and indicated as 62. The control line 62 extends to a location generally remote from the manifold assembly 34 and material supply 22. Depending on the particular embodiment being utilized, the control line 62 may extend along the discharge conduit 36 and may terminate adjacent to the discharge end 38. The control assembly further includes an operative control handle, which may assume a variety of different structures, generally indicated as 64. Control handle 64 serves to operate and/or selectively orient the control line 62 so as to selectively open or close the valve assembly 60. As indicated, the control handle 64 is manually operable and may also be spring biased as at 66. Therefore, a squeezing action or other manipulation exerted on the control handle 64 serves to pivot the valve assembly 60 into an open position and a release of the control handle 64 positions the valve assembly 62 into its normal, closed position.

While at least one embodiment of the present invention is directed to the "mechanical" operation of the valve assembly 60 by manipulation of a spring biased handle 64, the present invention also contemplates an electronic or solenoid activation or operation of valve assembly 60. More specifically, two solenoid devices could be cooperatively positioned, such as by being connected to the valve assembly on opposite sides thereof. Further, the solenoid devices could be independently activated such as by a manual manipulation of a structural modification of the handle 64 to positively open and close the valve assembly 60, thereby accomplishing a possibly more precise control of the flow of material from the material supply 22.

Another feature of the present invention is the provision of a vent assembly generally indicated as 70. The vent assembly 70 is disposed in fluid communication with the flow path and the interior of the discharge conduit 36 through the interior of the delivery conduit 46 to which it is attached preferably, but not necessarily, between the opposite ends of the delivery conduit 46. The vent assembly 70 preferably includes a continuously open vent conduit 72 interconnected, as by adaptor 72', to and extending outwardly from the delivery conduit 46. As clearly disclosed in FIG. 2, the structure of the vent assembly 70, including vent conduit 72 and adaptor segment 72', maintains and defines a continuously open fluid communication with the interior of delivery conduit 46 and exterior of the manifold 34. Accordingly, the vent assembly 70 is disposed and structured to release any and all back pressure existing within the discharge conduit 36, the manifold assembly 34 or other portions of the flow path 30 to atmosphere and/or the exterior of the manifold assembly 34.

Numerous factors including, but not limited to, the extended length of the discharge conduit 36, the flow rate and/or quantity of the particulate material passing along the flow path 30, and possibly the orientation of the discharge conduit 36 may cause at least some of the particulate material to "back-up" or become at least temporarily collected within the discharge conduit 36. As a result of the forced flow of air 31, schematically represented by the directional arrow in FIG. 2, continuously passing through and along the predetermined flow path 30 and the normally large quantity of particulate material traveling therewith, there may be a tendency for a build-up of back pressure. Such back pressure may extend into and through the manifold assembly 34 and have a tendency to force air flow, as well particulate material, in a reverse direction, up through the delivery conduit 46, as schematically represented by the directional arrow 59.

In order to prevent a back-up of the particulate material into the material supply 22, the continuously open vent assembly 70 is disposed and structured to eliminate the existence of any back pressure and/or back flow of air and accompanying material which has backed up in some portion of the flow path 30 and or manifold assembly 34. The back flow or back pressure may pass from the discharge conduit 36 and/or the receiving conduit 52, through the manifold assembly 34 and outwardly there from through the continuously open vent assembly 70. As represented in both FIGS. 1 and 2, the vent assembly 70 is disposed in fluid communication between the interior of the manifold assembly 34 and the delivery conduit 46 and being so disposed, may assume a variety of different structures, dimensions and configurations.

The structural features of the vent assembly 70 may include the connecting conduit or adaptor segment 72' and the vent conduit 72 being fixedly or removably connected to the delivery conduit 46 and to one another. As clearly disclosed in FIGS. 2 and 4 through 9 the conduits 72 and 72' are hollow and each includes oppositely disposed open ends, wherein vent conduit 72 includes an outer open end 73 which communicates directly with an exterior of the manifold assembly 34. In addition, the vent assembly 70, including the conduit components 72 and 72' thereof, may be disposed at a location other than intermediate the opposite ends of the delivery conduit 46. It is further emphasized that the continuously open vent assembly 70 may be structured differently from the embodiment represented in FIG. 2, such as, but not limited to, the adaptor segment 72' and/or the vent conduit 72 being replaced by another appropriate assembly structured to maintain a continuously open path of travel for venting the back pressure through the vent assembly 70. For example, an adaptor and/or attachment collar 75 may be attached to the open outer end 73 as will be explained hereinafter with primary reference to FIGS. 5 through 10.

Again it is to be emphasized that the versatility of the distribution assembly 10 of the present invention is further evident by its ability to be either removably or fixedly secured to any of a variety of different mobile platforms such as 12, 20, etc. By way of example, when mounted on the manually powered mobile platform 12, as demonstrated in FIG. 3, the adaptor assembly 34 would be attached in an area generally associated with the under carriage, such as at 15. Similarly, the support platform 24 for the blower assembly 26 may be secured to any preferred portion or surface 14' of the material supply 14 or other part of the mobile platform 12.

With further reference to FIG. 3, the spreader assembly 12' includes a material supply container 14 and a spreader mechanism generally indicated as 16. With or without the presence of the distribution assembly 10, the spreader mechanism 16 is interconnected by appropriate gearing to the wheel support mechanism 18 in a known manner. Material delivered by gravity from the material supply 14 is distributed by the spreader mechanism 16 in corresponding relation to the speed of travel of the spreader assembly 12'. Therefore, the spreader assembly 12' may operate in the conventionally intended fashion, even when the distribution assembly 10 of the present invention is mounted thereon, simply by maintaining the valve assembly 60 in its normally closed position. A control handle and associated positioning rod or member 21 and 21' serve to release the material within the material supply 14 to the spreader mechanism 16, in the conventional and intended manner.

However, when it is desired to activate or operate the distribution assembly 10 while supported on the mobile platform 12 of FIG. 3, the control handle 20 and control member 21' are oriented in a closed position. A spring biased control handle 66' is manually operable to selectively dispose the valve assembly 60 into either the aforementioned open or closed positions thereby controlling the flow of particulate material from the material supply 14 into the manifold assembly 34. For purposes of clarity the valve assembly, manifold assembly and other operative components of the distribution assembly 10, as described in FIGS. 1 and 2 are not shown in FIG. 3. In use, an appropriate control line 62' associated with the valve assembly 60 may extend along the handle assembly 17 of the mobile platform 12. The control line 62' is attached to the aforementioned control handle 66' which is moveably mounted within the reach of the hands of the user, relative to the handlebar structure 19.

As disclosed in the embodiment of FIG. 3, as well as the other preferred embodiments of the present invention, the discharge conduit 36 is preferably of extended length. Also, the discharge conduit is preferably formed of a flexible material thereby facilitating its orientation into any of an almost infinite number of positions during the distribution process. However, as set forth above, due to its extended length and flexibility of at least one preferred embodiment of the present invention, certain orientations of the discharge conduit 36, such as that represented in phantom lines of FIG. 3, may also encourage the backup of material within the discharge conduit 36, resulting in the creation of back pressure, as set forth above. Accordingly, the continuously open vent assembly 70 is disposed and structured to relieve such conditions.

FIG. 4 discloses another application of the present invention wherein a plurality of distribution assemblies each represented as 10', are mounted on a mobile platform, generally indicated as 80, in the form of a truck or other motorized vehicle. Each of the distribution assemblies 10' include an independent manifold assembly schematically indicated as 34' receiving forced air flow from at least one common blower assembly mounted on or within a housing as at 27. When a single blower assembly is utilized an appropriate connection as at 90 may be provided so as to provide the forced air flow from the blower assembly/housing 27 to the individual manifold assemblies 34'. In addition, each of the manifold assemblies 34' is supplied with the forced flow of air by separate conduits or adapters 32'.

Also, discharge conduits and the discharge ends thereof 36' and 38' respectively, are located downstream of respective ones of the manifold assembly 34' and are positioned so as to concurrently direct particulate material outwardly therefrom into a predetermined distribution area. By way of example, the distribution areas are schematically represented by adjacent rows of trees or like plants. Naturally, the specific location of the discharge conduits 36' may be altered and/or selectively adjustable dependent upon the particular application and location of the respective distribution areas which they are intended to cover.

Also, a control assembly generally indicated as 92 may include a single control assembly but more preferably comprises separately operable control handles 94 and 96. Each of the control handles 94 and 96 are connected by a control line 95 and 97 to a material flow regulating valve assembly (not shown) associated with each of the manifold assemblies 34'. Accordingly, the control assembly 92 allows for the concurrent and/or independent operation of each of the distribution assemblies 10' so as to independently control or regulate the particulate material issuing from each of the discharge conduits 36' as shown.

Yet another preferred embodiment of the assembly of the present invention is disclosed in FIGS. 5 through 10. For purposes of clarity, FIG. 10 comprises a legend schematically indicating the direction of flow of the particulate material as at 58; air pressure or air flow 31 as generated by the blower assembly 26; back pressure or air flow created thereby as at 59; and negative or vacuum pressure and the air flow created thereby as at 61.

More specifically, and as set forth above, numerous factors may cause at least some of the particulate material to "back up" or become at least temporarily collected with the discharge conduit, the receiving conduit or segment 52 and/or other portions of the manifold assembly 34 and/or flow path. As a result, there may be a build up or back pressure created along the flow path which may extend through and into the manifold assembly 34. Such back pressure will have a tendency to force air flow 59, as well as particulate material, in a reverse direction and up through the delivery conduit 46 and into at least a portion of the vent assembly 70, as represented in FIGS. 6 and 7. In order to relieve such back pressure and prevent excessive back up of the particulate material into the delivery conduit 46 and possibly into or towards the supply container 22, the vent assembly 70 is maintained in a continuously open state so as to vent virtually any back pressure.

In addition, even after the flow of particulate material from the supply container 22 has stopped, there may be a tendency for the back flow of material to accumulate within some portion of the vent assembly 70 as demonstrated in FIG. 8. In order to facilitate the removal or passage of such particulate material from the interior of the vent assembly 70, an additional preferred embodiment of the present invention comprises the positioning of at least a portion of the manifold assembly 34 in a predetermined angular orientation or angle of inclination relative to a normally vertical orientation thereof.

With primary reference to FIG. 5, a normal and substantially vertical orientation of portions of the manifold assembly 34 is represented as 100. During operation of many preferred embodiments of the present invention, the manifold assembly 34 including, but not limited to, the delivery conduit 46 will be oriented in substantial alignment with the vertical orientation 100. It is of course understood that the mobile platform on which the assembly 10 is mounted may be traveling over uneven terrain which will vary the orientation of the manifold assembly 34 from its normal vertical orientation 100 during operation.

However, in the preferred embodiment of FIGS. 6 through 9, the positioning of at least a portion of the manifold assembly 34 in a predetermined angular orientation from vertical 100 as at 102 results in the inclination or angular orientation of the vent assembly 70 such that it is inclined at a predetermined angle sufficient to facilitate the passage of the accumulated material 99, under the influence of gravity, back into the interior of the delivery conduit 46 so as to again be entrained within the air flow 31 created by the blower assembly.

With reference to FIGS. 8 and 9, it will be understood that even when the valve assembly 60 is closed to stop the supply of particulate material from the supply container 22, the air flow 31 generated by the blower 26 will create an at least partial negative pressure within at least a portion of the delivery conduit 46 as well as within the interior of the vent assembly 70. Such negative air flow or pressure is schematically represented by the directional arrow 61. This negative pressure, will further aid in the removal of the accumulated particulate material 90 from the interior of the vent assembly as will the force of gravity exerted on the accumulated particulate material 99 due to the angular orientation or inclination of the assembly 70, and/or the delivery conduit 46.

A structural modification of this preferred embodiment of the present invention would be the angular orientation of the vent assembly itself relative to the flow path, wherein the delivery conduit 34 may be maintained in the substantially vertical orientation 100 schematically represented in FIG. 5. It is further emphasized that the "predetermined angular orientation" schematically represented in FIG. 5 as 104 may vary significantly. However, such predetermined angular orientation 104 should be sufficient to facilitate the removal of the accumulate particulate material 99, due to the influence of gravity, even in the absence of a negative pressure or vacuum and the air flow associated therewith, as at 61.

Accordingly, in the normal operation of the various embodiments of FIGS. 6 through 9 of the assembly 10, product will be passed from the supply 22 through the open end 47 and into the interior and through the delivery conduit 46 into the receiving conduit or segment 52 and along the intended flow path to the discharge conduit 36. The forced flow of particulate material will be caused by the air pressure or air flow 31 generated by the blower 26. However, if back pressure begins to build resulting in the accumulation of material in the discharge conduit 36 or any portion of the manifold assembly 34, venting will occur through the vent assembly 70 as indicated by the directional arrow 59. This will eliminate or significantly reduce the possibility of extensive back up of the material into the supply container 22 during the normal operation of the assembly 10.

However, assuming that the air flow 31 continues, the particulate material 99, which may have accumulated within the interior of the vent assembly 70, will have a tendency to pass therefrom under the influence of gravity due to the predetermined angular orientation of at least a portion of the manifold assembly 34 including the vent assembly 70 and/or the delivery conduit 46. In addition, the continuous flow of air 31 will result in the creation of a vacuum or at least a minimal air flow 61 due to the fact that the vent assembly 70 is continuously open. Such air flow 61, in addition to the influence of gravity, will cause the accumulated particulate material 99 to pass from the interior of the vent assembly back into the flow path.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly structured to distribute particulate material, said assembly comprising:

a) a blower assembly structured to generate a forced flow of air along a predetermined flow path, b) a manifold assembly including a delivery conduit in a first direction disposed and structured to channel the particulate material from a material supply to said predetermined flow path, c) said predetermined flow path at least partially defined by a discharge conduit connected to said manifold assembly downstream thereof, and d) a vent assembly comprising an open vent oriented in a second direction connected to said delivery conduit and disposed and structured to release back pressure from said predetermined flow path to an exterior of said manifold assembly.

2. An assembly as recited in claim 1 wherein said manifold assembly further includes a receiving segment disposed in material receiving relation to said delivery conduit.

3. An assembly as recited in claim 2 wherein said receiving segment is disposed along and in fluid communication with said predetermined flow path between said blower assembly and said discharge conduit.

4. An assembly as recited in claim 1 wherein said vent is structured to maintain an open orientation at least during flow of the particulate material along said discharge conduit, said vent disposed to release any back pressure within said discharge conduit through said manifold assembly.

5. An assembly as recited in claim 1 wherein said vent is connected to said delivery conduit intermediate opposite ends thereof.

6. An assembly as recited in claim 1 wherein said vent comprises a vent conduit connected to said delivery conduit and disposed in fluid communication with an interior of said delivery conduit and atmosphere on an exterior of said manifold assembly.

7. An assembly as recited in claim 1 wherein said vent is connected between and in fluid communication with an interior of said delivery conduit and an exterior of said manifold assembly.

8. An assembly as recited in claim 1 further comprising a valve assembly disposed between said delivery conduit and the material supply and structured to regulate material flow to said manifold assembly through said delivery conduit.

9. An assembly as recited in claim 1 wherein at least a portion of said manifold assembly is disposed at a predetermined angular orientation relative to said flow path.

10. An assembly as recited in claim 9 wherein said predetermined angular orientation is sufficient to facilitate gravity flow of the particulate material from said vent assembly.

11. An assembly structured to distribute particulate material, said assembly comprising:

a) a blower assembly structured to generate a forced flow of air along a predetermined flow path, b) a manifold assembly including a delivery conduit in a first direction disposed and structured to channel the particulate material from a material supply to said predetermined flow path, c) said manifold assembly further including a receiving segment disposed in material receiving relation to said delivery conduit and positioned to define at least a portion of said predetermined flow path, d) said predetermined flow path further comprising a discharge conduit disposed downstream of said manifold assembly and in material receiving relation thereto, e) a vent assembly comprising an open vent oriented in a second direction, connected and in fluid communication with said delivery conduit and structured to release back pressure existing in said predetermined flow path to an exterior of said manifold assembly, and f) said vent structured to maintain an open orientation.

12. An assembly as recited in claim 11 wherein said vent assembly is connected between and in fluid communication with an interior of said delivery conduit and atmosphere on an exterior of said manifold assembly.

13. An assembly as recited in claim 11 wherein said vent assembly is connected to said delivery conduit intermediate opposite ends thereof.

14. An assembly as recited in claim 11 further comprising a valve assembly disposed between said delivery conduit and the material supply and structured to regulate material flow to said manifold assembly.

15. An assembly as recited in claim 14 further comprising a valve control mechanism connected to said valve assembly and remotely disposed, at least in part, relative thereto, said valve control mechanism operative to regulate material flow into said delivery conduit.

16. An assembly as recited in claim 11 wherein said vent assembly is disposed at a predetermined angular orientation relative to said flow path.

17. An assembly as recited in claim 16 wherein said predetermined angular orientation is sufficient to facilitate removal of accumulated particulate material, under the influence of gravity, from said vent assembly.

18. An assembly as recited in claim 16 wherein said delivery conduit is disposed at a predetermined angular inclination from a substantially vertical orientation, said predetermined angular inclination being sufficient to facilitate gravity flow of the particulate material from said vent assembly.

19. An assembly structured to distribute particulate material, said assembly comprising:
   a) a mobile platform including a material supply mounted thereon,
   b) at least one blower assembly mounted on said mobile platform and structured to generate a forced flow of air along a predetermined flow path,
   c) at least one manifold assembly mounted on said mobile platform and including a delivery conduit disposed and structured to channel material from said material supply to said predetermined flow path,
   d) said manifold assembly including a receiving segment disposed in material receiving relation to said delivery conduit and positioned to define at least a portion of said predetermined flow path,
   e) a discharge conduit connected to said manifold assembly downstream thereof along said predetermined flow path and in material receiving relation thereto, and
   f) an open vent assembly connected to said manifold assembly and structured to release back pressure from said predetermined flow path to an exterior of said manifold assembly.

20. An assembly as recited in claim 19 wherein said mobile platform is manually powered.

21. An assembly as recited in claim 19 wherein said mobile platform comprises a motorized vehicle.

22. An assembly as recited in claim 19 wherein said blower assembly is removably mounted on said mobile platform.

* * * * *